United States Patent
Linson (10) Patent No.: US 10,252,682 B2
(45) Date of Patent: Apr. 9, 2019

(54) METHOD AND APPARATUS FOR SECURING ALIGNMENT MEASUREMENT COMPONENTS TO LARGE DIAMETER WHEELS

(71) Applicant: Hunter Engineering Company, St. Louis, MO (US)

(72) Inventor: Dennis Linson, St. Charles, MO (US)

(73) Assignee: Hunter Engineering Company, St. Louis, MO (US)

(*) Notice: Subject to any disclaimer, the term of this patent is extended or adjusted under 35 U.S.C. 154(b) by 251 days.

(21) Appl. No.: 15/153,490

(22) Filed: May 12, 2016

(65) Prior Publication Data

US 2016/0334209 A1 Nov. 17, 2016

Related U.S. Application Data

(60) Provisional application No. 62/161,483, filed on May 14, 2015.

(51) Int. Cl.
*G01B 5/255* (2006.01)
*B60R 11/00* (2006.01)
*G01M 17/013* (2006.01)

(52) U.S. Cl.
CPC ............ *B60R 11/00* (2013.01); *G01B 5/255* (2013.01); *G01M 17/013* (2013.01); *G01B 2210/10* (2013.01); *G01B 2210/24* (2013.01)

(58) Field of Classification Search
CPC ....... G01B 5/255; G01B 11/275; G01B 21/26
USPC ...................................... 33/203.18
See application file for complete search history.

(56) References Cited

U.S. PATENT DOCUMENTS

| 2,675,200 | A | * | 4/1954 | Wohlforth | G01M 1/28 248/201 |
| 2,777,211 | A | * | 1/1957 | Martin | G01B 5/255 33/203.13 |
| 3,426,991 | A | | 2/1969 | Rishovd | |
| 3,624,915 | A | | 12/1971 | Wilkerson | |
| 3,648,375 | A | * | 3/1972 | Wilkerson | G01B 5/255 248/279.1 |
| 3,869,798 | A | * | 3/1975 | Wilkerson | G01M 17/013 248/205.1 |
| 4,337,581 | A | * | 7/1982 | Eck | G01B 5/255 33/203.18 |
| 4,363,175 | A | | 12/1982 | Hedahl | |
| 4,377,038 | A | | 3/1983 | Ragan | |
| 4,534,115 | A | * | 8/1985 | Kashubara | G01B 5/255 33/193 |
| 4,803,785 | A | * | 2/1989 | Reilly | G01B 5/255 33/203.18 |

(Continued)

*Primary Examiner* — Christopher W Fulton
(74) *Attorney, Agent, or Firm* — Sandberg Phoenix & von Gontard, P.C.

(57) ABSTRACT

A set of light-weight adaptor assemblies suitable for use with optical targets, angle sensors, or other instrumentation. A first configuration of adapter assembly within the set is easily secured against the outboard surfaces a large-diameter vehicle wheel assembly having a highly convex raised central hub region, without concern for precise axial alignment or centering, while a second configuration of adapter assembly within the set is easily secured against the outboard surfaces of a large-diameter vehicle wheel assembly having a highly concave recessed central hub region, without concern for precise axial alignment or centering.

21 Claims, 8 Drawing Sheets

(56) References Cited

U.S. PATENT DOCUMENTS

| | | | |
|---|---|---|---|
| 5,048,192 A | 9/1991 | Pascoal | |
| 5,056,231 A * | 10/1991 | Alusick | G01B 5/255 33/203.18 |
| 5,446,967 A * | 9/1995 | Gender | G01B 5/255 33/203.18 |
| 5,625,953 A | 5/1997 | Healy et al. | |
| 5,987,761 A | 11/1999 | Ohnesorge | |
| 6,131,293 A | 10/2000 | Maioli et al. | |
| 6,282,799 B1 | 9/2001 | Warkotsch | |
| 7,093,369 B2 * | 8/2006 | Ohnesorge | B60B 7/18 33/203.18 |
| 7,150,105 B1 | 12/2006 | Battaglia et al. | |
| 7,444,752 B2 | 11/2008 | Stieff et al. | |
| 7,702,126 B2 * | 4/2010 | Strege | B66F 7/28 187/203 |
| 7,703,212 B2 | 4/2010 | Stieff et al. | |
| 7,810,244 B2 | 10/2010 | Stieff et al. | |
| 7,870,677 B2 | 1/2011 | Gray et al. | |
| D636,003 S | 4/2011 | Linson et al. | |
| 8,033,028 B2 | 10/2011 | Stieff et al. | |
| 8,215,023 B2 | 7/2012 | Stieff et al. | |
| D667,037 S | 9/2012 | Linson et al. | |
| 8,341,848 B2 | 1/2013 | Stieff et al. | |
| 8,561,307 B2 | 10/2013 | Stieff et al. | |
| 9,134,125 B2 | 9/2015 | Gray et al. | |
| 2002/0170195 A1 * | 11/2002 | Corghi | G01B 5/255 33/520 |
| 2011/0146089 A1 | 6/2011 | Gray et al. | |
| 2011/0148180 A1 * | 6/2011 | Szelag | B60B 7/20 301/1 |

* cited by examiner

METHOD AND APPARATUS FOR SECURING ALIGNMENT MEASUREMENT COMPONENTS TO LARGE DIAMETER WHEELS

CROSS-REFERENCE TO RELATED APPLICATIONS

The present application is related to, and claims priority from, co-pending U.S. Provisional Patent Application Ser. No. 62/161,483 filed on May 14, 2015, which is herein incorporated by reference.

STATEMENT REGARDING FEDERALLY SPONSORED RESEARCH

Not Applicable.

BACKGROUND OF THE INVENTION

The present invention relates to vehicle service systems, and in particular to adaptors configured for securing optical targets or angle sensors to a surface of a large diameter vehicle wheel assembly, such as a heavy duty truck wheel assembly, during a vehicle wheel alignment measurement or inspection procedure.

A vehicle wheel alignment measurement or inspection system consists generally of a console having a computer or processing unit, a number of sensors for providing data to the computer or processing unit, one or more display devices such as a monitor, and one or more input devices such as a keyboard. The processing unit is configured with one or more software applications, at least one of which is adapted to facilitate the measurement or inspection of alignment angles associated with one or more vehicle wheel assemblies on a vehicle, each consisting of a rim and an associated tire. The processing unit is configured to utilize input data received either from angle sensors mounted to the vehicle wheel assemblies, or from imaging sensors acquiring images of optical targets secured to the vehicle wheel assemblies, or a combination thereof.

Figure 1A:
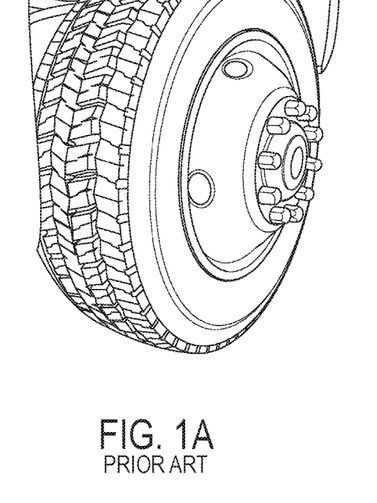
FIGS. 1A and 1C illustrate perspective views of a large diameter raised central hub wheel assembly with, and without, a mounted prior art self-centering adaptor assembly.
Figure 1B:
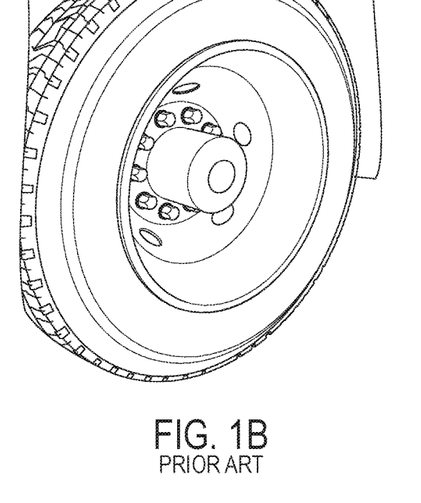
FIGS. 1B and 1D illustrate perspective views of a large diameter recessed central hub wheel assembly with, and without, a mounted prior art self-centering adaptor assembly.

Unlike the wheel assemblies often found on passenger vehicles, wheel assemblies found on heavy duty trucks often incorporate rims which are adapted for reversible mounting in dually wheel assemblies. As seen in FIGS. 1A and 1B, these rims are designed with highly convex surfaces to facilitate attachment to a wheel hub assembly in either an inner or outer position of a dual wheel arrangement. Typically, the rims are mounted with the convex surfaces projecting outward on single-wheel or steerable axles, such as found at the front of the vehicles, while the rims are mounted in the reverse configuration in the outermost position on dual-wheel axles, such as found at the rear of the vehicles. A variety of different placement configurations about a vehicle are possible, depending upon the number and type of axles present.

Figure 1C:
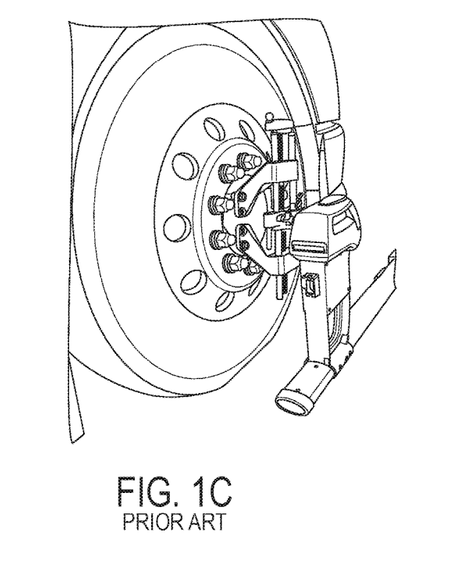
Figure 1D:
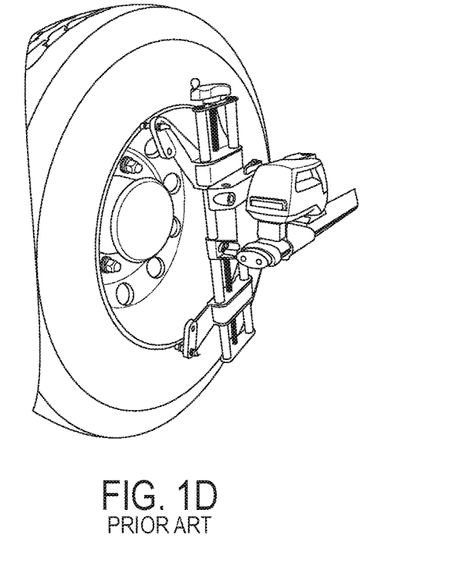

Traditionally, angle sensors or optical targets are temporarily affixed to these vehicle wheel assemblies utilizing precision rim-clamping wheel adaptors such as shown in FIG. 1C and 1D. These adaptors are configured to clamp onto either a hub bore edge of the rim as seen in FIG. 1C, or to the outer rim edge as seen in FIG. 1D. Once secured, the adaptors position a mounting point for an angle sensor or an optical target in a position which is substantially coaxial with the wheel assembly axis of rotation. These traditional precision rim-clamping wheel adaptors typically include a set of claws or feet adapted to secure the wheel adaptor to the wheel assembly by engaging an edge of the wheel rim, such as adjacent to the tire junction or the wheel hub. An adjustable centering mechanism on the wheel adaptor ensures that the claws or feet of the wheel adaptor are adjusted in a symmetrical manner to maintain the mounting point for the angle sensor or optical target in a determined configuration relative to the axial center of the rim surface being engaged.

To provide increased stability during rolling movement of the wheel assembly, some traditional precision wheel adaptors include clamps for gripping a circumferential tread surface of the associated tire, such as seen in U.S. Pat. No. 5,987,761 to Ohnesorge and U.S. Pat. No. 6,131,293 to Maioli et al. These traditional precision rim-clamping adaptors each utilize a set of gripping arms adapted to engage tire surfaces in conjunction with the set of contact supports and centering mechanisms for symmetrically engaging the circumferential lips of the wheel rims, and for securing the wheel adaptors in axially centered positions relative to the vehicle wheel assemblies onto which they are mounted.

When configured for use with large diameter highly convex (or concave) vehicle wheel assemblies, such as found on heavy duty trucks or vehicles with dually rear axles, traditional precision rim-clamping adaptors must be provided with enough structure to provide suitable clearances around the raised wheel assembly hub structures. As a result, traditional precision adapters often become large, heavy, and awkward to use with heavy duty vehicles. Furthermore, due to higher inflation pressures often used in the large diameter wheel assemblies of heavy duty vehicles, engagement of the claws or feet of a traditional precision adaptor into the interface between the tire and wheel rim edge of the wheel assembly become significantly more difficult. Overall, the process of attaching a traditional precision adaptor to a large diameter wheel on a heavy-duty vehicle with either a raised or recessed central hub surface is time consuming and prone to errors resulting from poor surface engagements.

Light-weight adaptor assemblies with optical targets have been developed for use when acquiring measurements from the wheel assemblies on passenger car and light truck wheels. These light-weight adaptor assemblies, such as shown in U.S. Pat. No. 8,341,848 B2 to Stieff et al. are designed to be placed against an outboard surface of a relatively flat-faced wheel rim, in a non-determined position over the wheel axis of rotation. A pair of wheel clamp arms are then engaged with the tread surfaces of the tire to retain the adaptor in place while measurements are acquired from a multi-surface optical target disposed on the outboard end of the adaptor. In order to minimize the weight and clamping force required to keep the adaptor secured to the vehicle wheel assembly during use, the structure of the adaptor is designed to carry the optical target as close to the vehicle wheel assembly outboard surface as possible. This structural design renders it difficult or impossible to utilize the light-weight passenger vehicle adaptor assemblies on a vehicle wheel assembly having a prominently raised central hub surface as seen in FIG. 1A without the use of extension components to provide the required clearance. Similarly, the light weight passenger vehicle adaptor assembly is difficult to utilize on a vehicle wheel assembly having a deeply recessed central hub surface as seen in FIG. 1B, due to a lack of planar surfaces onto which the adaptor base can be positioned in a stable manner.

Accordingly, it would be advantageous to provide a light-weight adaptor assembly suitable for use with either optical targets or angle sensors, and which can be secured to large diameter vehicle wheels on a heavy duty vehicle having prominently raised central hub surfaces easily and without concern for precise axial alignment or centering.

It would be further advantageous to provide a light-weight adaptor assembly suitable for use with either optical targets or angle sensors, and which can be secured to large diameter vehicle wheels on a heavy duty vehicle having deeply recessed central hub surfaces easily and without concern for precise axial alignment or centering.

BRIEF SUMMARY OF THE INVENTION

Briefly stated, an embodiment of the present disclosure provides a set of light-weight adaptor assemblies suitable for use with either optical targets or angle sensors on a heavy-duty vehicle. A first adapter assembly within the set can be secured without concern for precise axial alignment or centering to large diameter vehicle wheel assembly having a highly convex outer face, and a second adapter assembly within the set can be secured similarly to a large diameter vehicle wheel assembly having a deeply concave outer face.

In further embodiment, a raised-hub light-weight adaptor assembly is configured for abutting placement against an outer surface of a large diameter vehicle wheel assembly, in a non-determined position relative to the wheel assembly rotational axis, and surrounding any axially-raised central mounting hub surfaces or lug bolts. The raised-hub light-weight adaptor assembly comprises an annular base having a plurality of coaxially projecting webs supporting a receiving member axially spaced from the annular base. The receiving member includes a coupling suitable for receiving either an optical target or an angle sensor for acquiring angular measurements. A spring-biased clamp assembly is coupled to the annular base by a pair of linkages, passing axially inboard of the receiving member between the coaxially projecting webs. Extending radially outward from the clamp assembly, a pair of wheel clamp arms are adjustably configured to engage the tread surface of a tire when the annular base is in abutting placement against the outer surface of a large diameter vehicle wheel assembly. Operation of the spring-biased clamp assembly applies a clamping load to the tire tread surface through the wheel clamp arms, holding the annular base in abutting placement against the outer surface of the vehicle wheel assembly.

In a another embodiment, a recessed-hub light-weight adaptor assembly is configured for abutting placement against an inner rim edge of a large diameter wheel assembly having a deeply recessed central hub, in a non-determined position relative to the wheel assembly rotation axis. The recessed-hub light-weight adaptor assembly comprises a base assembly having a set of at least three contact surfaces for the abutting placement against the inner rim edge of the large diameter wheel assembly. A support framework carried axially opposite the contact surfaces by the base assembly includes at least one coupling suitable for receiving either an optical target or an angle sensor for acquiring angular measurements. A spring-biased clamp assembly is coupled to the base assembly by a pivoting linkage assembly, positioned axially inboard of the support framework. Extending radially outward from the clamp assembly, a pair of wheel clamp arms are adjustably configured to engage the tread surface of a tire when the contact surfaces are in abutting placement against the inner rim edge of a large diameter vehicle wheel assembly. Operation of the spring-biased clamp assembly applies a clamping load to the tire tread surface through the wheel clamp arms, holding the contact surfaces in abutting placement against the inner rim edges of the vehicle wheel assembly.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

In order to fully describe the apparatus and methods of the present disclosure, the following terms and definitions will be utilized in reference to a vehicle wheel assembly. The term "inboard surface" refers to the surface of an object, such as a vehicle wheel assembly, which is facing a centerline of the vehicle on which the wheel assembly is mounted. The term "inboard direction" refers to movement along a wheel assembly axis of rotation towards a point of intersection between the axis of rotation and the centerline of the vehicle. The terms "outboard surface" and "outboard direction" refer to the opposite surface and movement in the opposite direction from the inboard surface and inboard direction. Based on these definitions, it will be readily understood that an object can be described relative to a vehicle, as being "inboard" or "outboard" from another object or along an axis of rotation.

Figures 3, 4:
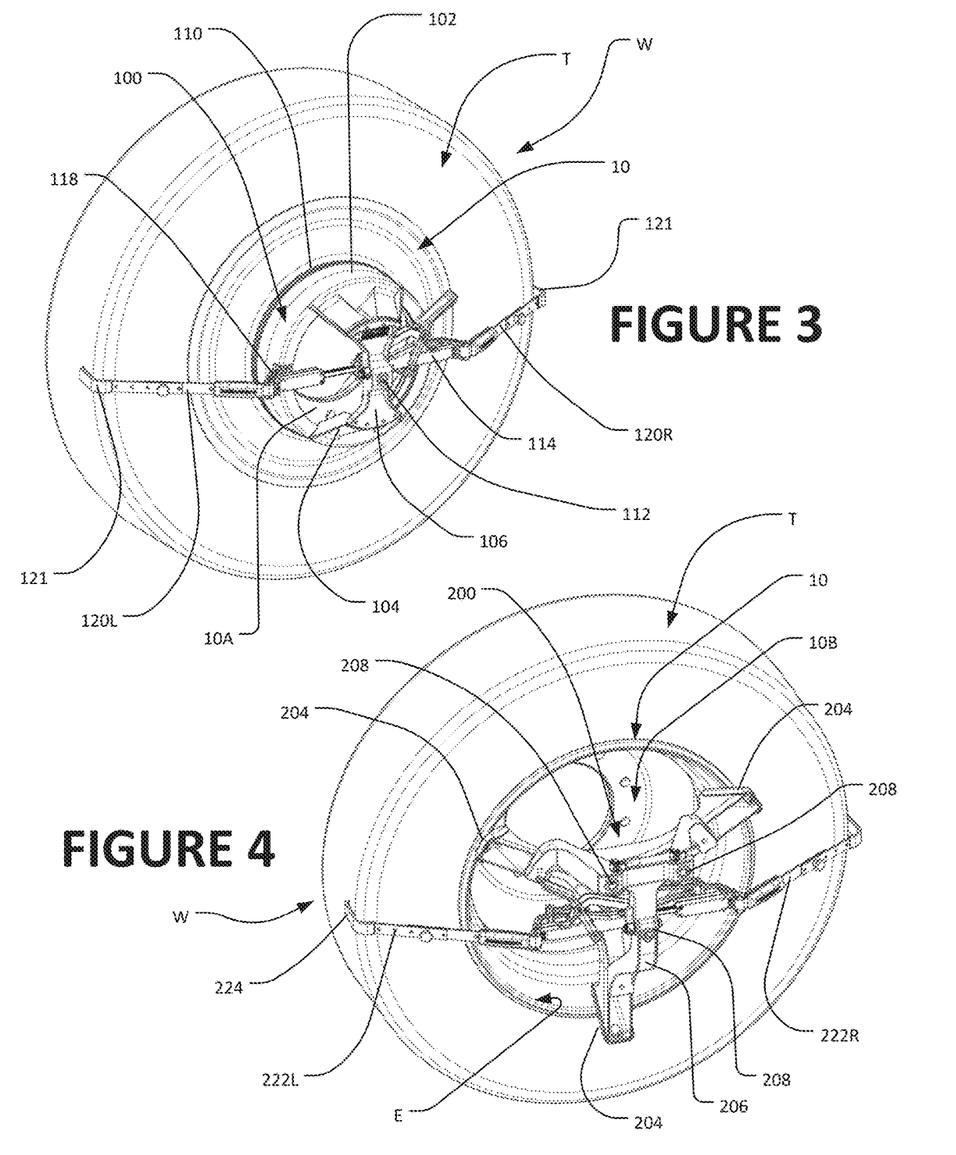
FIG. 3 is a perspective view of a raised-hub light weight adaptor assembly of the present disclosure secured to the outside surface of a large diameter vehicle wheel assembly.
FIG. 4 is a perspective view of a recessed-hub light weight adaptor assembly of the present disclosure secured against the inner rim surface of a large diameter vehicle wheel assembly with a recessed central hub.
Figure 5:
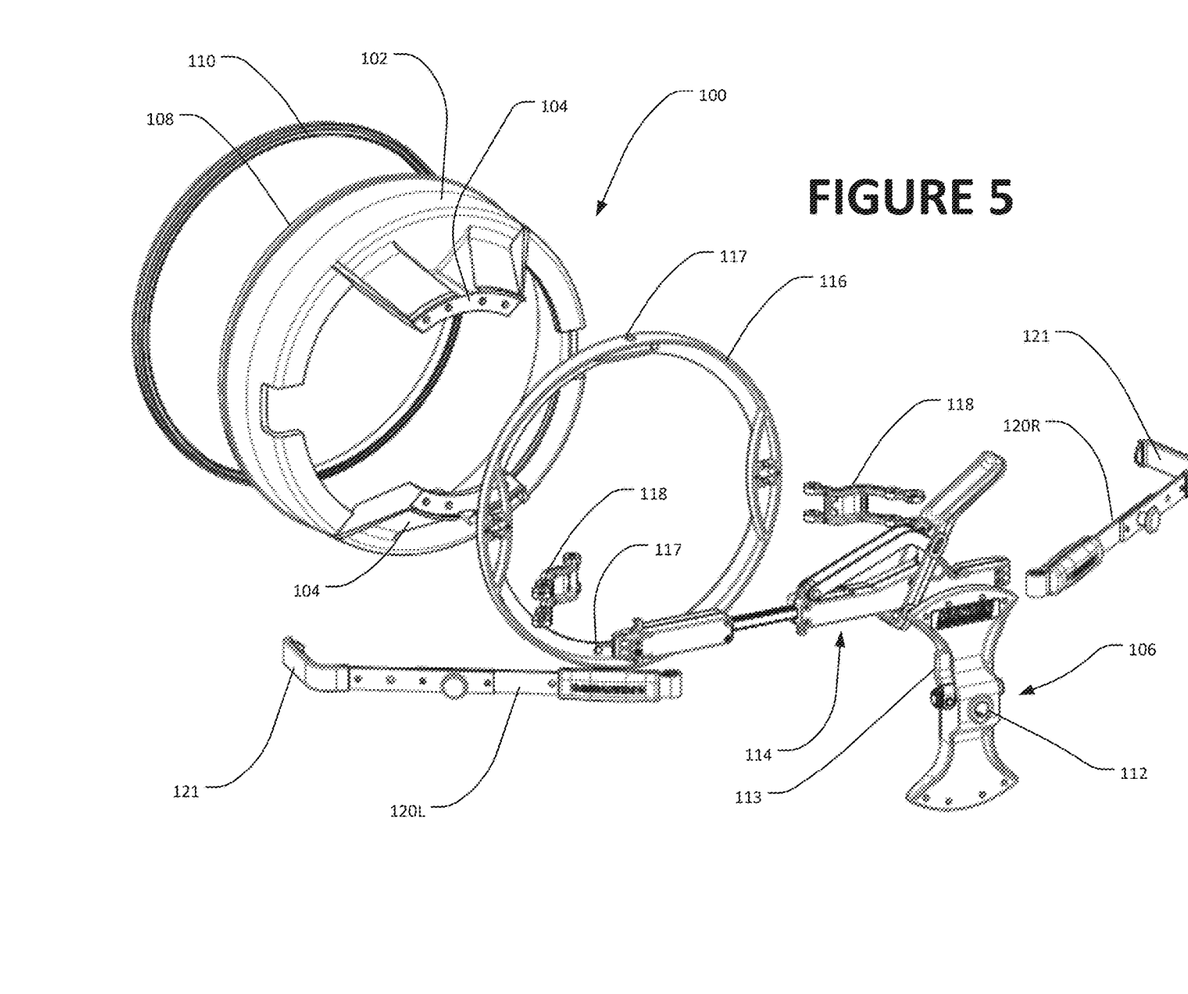
FIG. 5 is a perspective exploded view of the raised-hub light weight adaptor assembly of FIG. 3.
Figure 6:
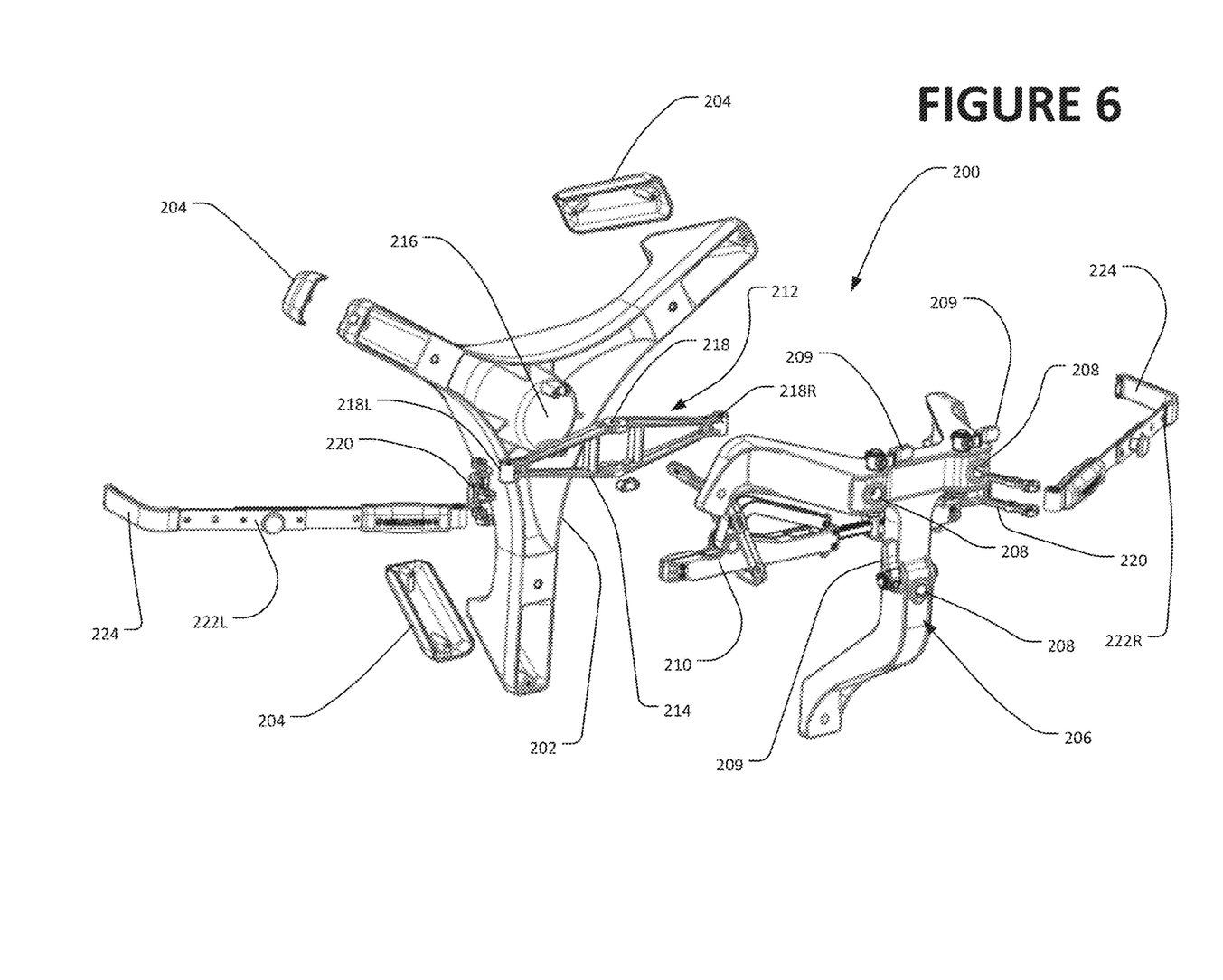
FIG. 6 is a perspective exploded view of the recessed-hub light weight adaptor assembly of FIG. 4.

Turning to FIGS. 3 and 5, a raised-hub light-weight adaptor is shown generally at 100. The raised-hub light-weight adaptor assembly 100 is configured for abutting placement against an outboard surface of a rim 10 of a large diameter vehicle wheel assembly W having a raised (or convex) central hub surface 10A such as seen in FIG. 1A, typically found on a front steer axle of a heavy duty vehicle. The assembly 100 is configured for placement in a non-determined position relative to the wheel assembly rotational axis, and surrounding an axially-raised central mounting hub surface or lug bolt circle 10A of the rim 10. The raised-hub light-weight adaptor assembly 100 comprises an annular base 102 having a plurality of coaxially projecting webs 104 supporting a receiving member 106 axially spaced outward from the annular base 102. The annular base 102 has a sufficient diameter and axial height for placement surrounding the axially raised central mounting hub surface or lug bolt circle 10A on most large diameter vehicle wheel assemblies W, such as commonly found on heavy-duty vehicles with dual-wheel rear axles. The inboard surface 108 of the annular base may optionally receive a protective covering 110, in the form of a ring of compliant material suitable for protecting finished surfaces on the vehicle wheel assembly W. The receiving member 106, coupled between the webs 104, includes a coupling 112 suitable for receiving a stub-shaft connector from an optical target (not shown), an angle sensor unit (not shown) configured to acquire vehicle wheel measurements, or other instrumentation such as a laser emitter. A locking assembly 113, such as a lever or cam, may be provided to secure the connector within the coupling 112.

A clamp assembly 114, such as a spring-biased clamp assembly, is coupled to a support ring 116 by a pair of double-pivoting linkages 118. The clamp assembly 114 is disposed axially inboard of the receiving member 106, between the plurality of coaxially projecting webs 104, and the support ring 116 is secured to the inner radial surface of the annular base 102 at a pair of opposed pivot points 117. Each linkage 118 is pivotally mounted to the support ring 116 at a first end, and to the spring-biased clamp assembly 114 at an opposite end, facilitating flexibility in the positioning of the clamp assembly 114 during attachment of the assembly 100 to a large-diameter vehicle wheel assembly W. Limited pivoting movement of the support ring about an axis defined by the opposed pivot points 117 facilitated flexibility in the orientation of the clamp assembly 114 during attachment of the assembly 100 to the large-diameter vehicle wheel assembly W. Extending radially outward from pivoting connections on opposite lateral sides of the clamp assembly 114, a pair of wheel clamp arms 120L and 120R are each configured to engage the tread surface of a tire T with suitable hooks 121 when the annular base 102 is in abutting placement against the generally vertical outer surface of the rim 10 of the large diameter vehicle wheel assembly W. The wheel clamp arms may be either fixed in length or longitudinally adjustable, and the tire hooks 121 may be rigidly coupled to the clamp arms or incorporate a pivoting connection.

Operation of the clamp assembly 114 applies a clamping load to the tire T tread surface through the wheel clamp arms 120L and 120R, holding the annular base 102 against the outer surface of the rim 10 of vehicle wheel assembly W. Those of ordinary skill in the art will recognize that the specific configuration of the tension and locking mechanism 114, as well as the wheel clamp arms 120L and 120R may be varied from that which is shown in the accompanying figures. Any suitable mechanism capable of mechanical adjustment to engage the surfaces of a tire T mounted to the rim 10 upon which the assembly 100 is to be mounted, and which is further capable of providing a releasable clamping and/or tensioning force, such as by means of a combination of springs, levers, and/or cams, such as shown in U.S. Pat. No. 7,810,244 B2 to Stieff et al. or in U.S. Pat. No. 8,341,848 B2 to Stieff et al., may be utilized without departing from the scope of the present disclosure.

It will be further recognized that the annular base 102 is not required to be placed coaxial with the wheel assembly rotational axis, but rather, may be secured in abutting placement against the outboard surface of the rim 10 of the vehicle wheel assembly W in a non-determined position. A relationship between an optical target or angle sensor mounted to the receiving member 106 at the coupling 112 and the axis of rotation for the vehicle wheel assembly W can be subsequently determined during a suitable compensation procedure.

Turning to FIGS. 4 and 6-11, a recessed-hub light-weight adaptor is shown generally at 200. The recessed-hub light-weight adaptor assembly 200 is configured for abutting placement against an inner edge region E of a rim 10 in a large diameter wheel assembly W having an outboard surface with a recessed central hub 10B (such as in FIG. 1B), as typically found on a rear axle of a heavy-duty vehicle. The inner rim edge region E is bounded at an outermost diameter by a rim lip, and encompasses an adjacent annular portion of the wheel rim outer surface which includes the radial rim surface defining the rim lip, at least an outermost portion of the generally axial surface extending towards the recessed central hub 10B, and a curved transition region between the radial and axial rim surfaces.

Figure 7:
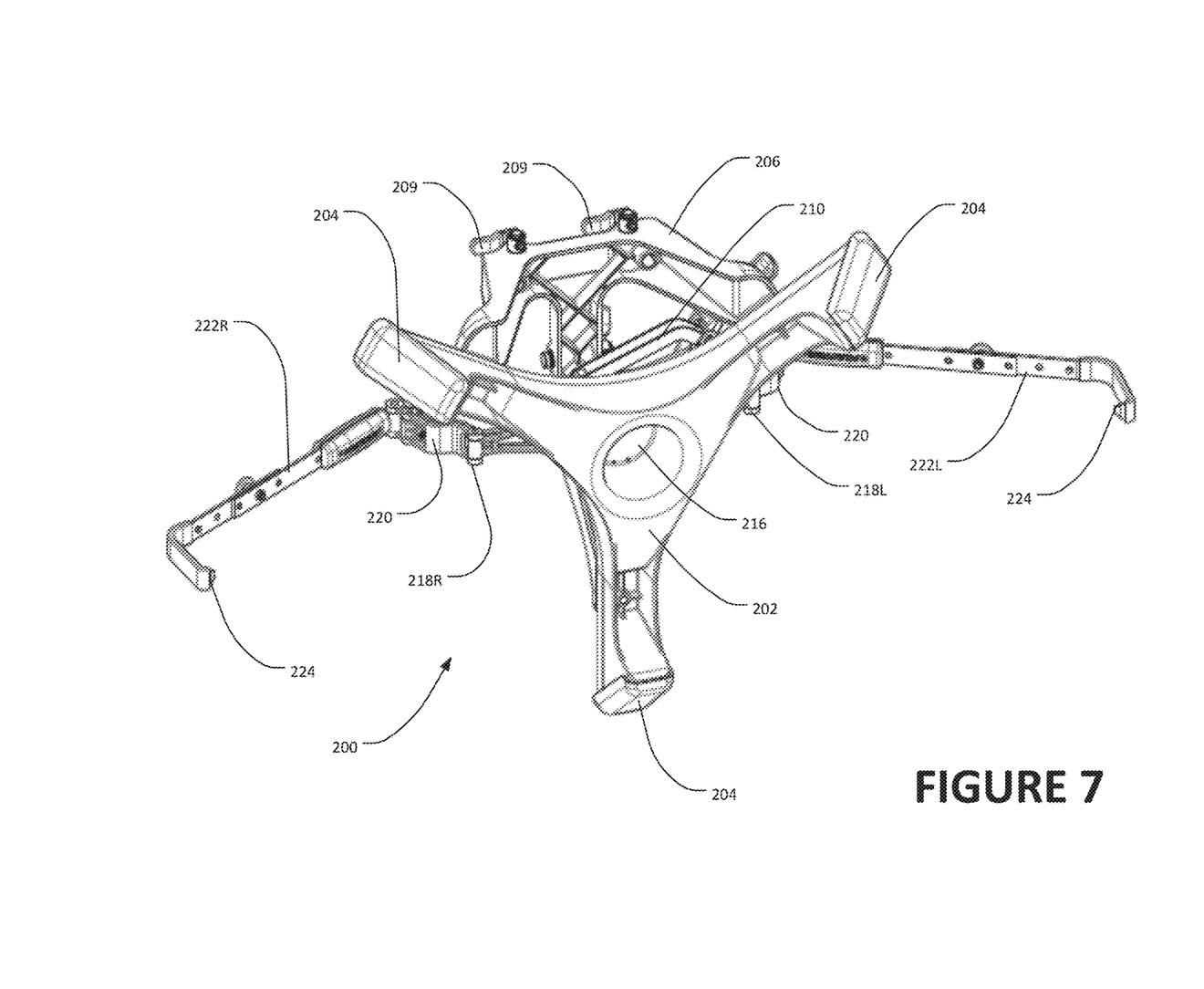
FIG. 7 is a perspective rear view of the recessed-hub light weight adaptor assembly of FIG. 4.
Figure 8:
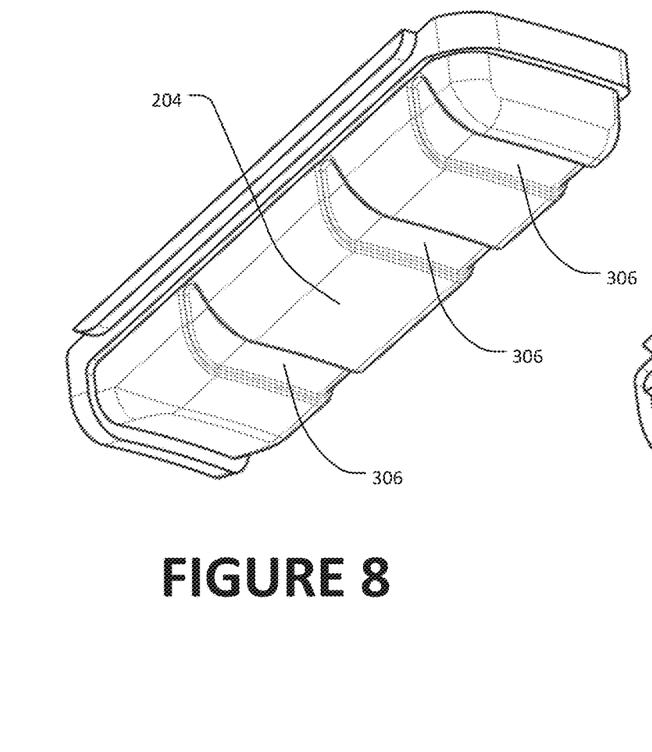
FIG. 8 is a front perspective view of an alternate configuration for one of the rim contact surfaces elements of the recessed-hub light weight adapter assembly of FIG. 4, including spaced recesses corresponding to standard rim diameters.
Figure 9:
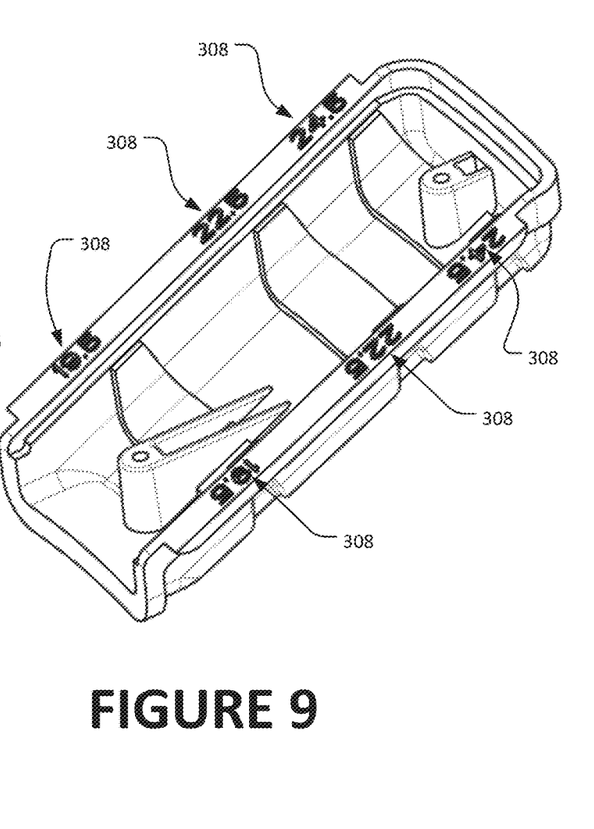
FIG. 9 is a rear perspective view of the rim contact surface element shown in FIG. 8, illustrating rim diameter indicia aligned with the spaced recesses.
Figures 10, 11:
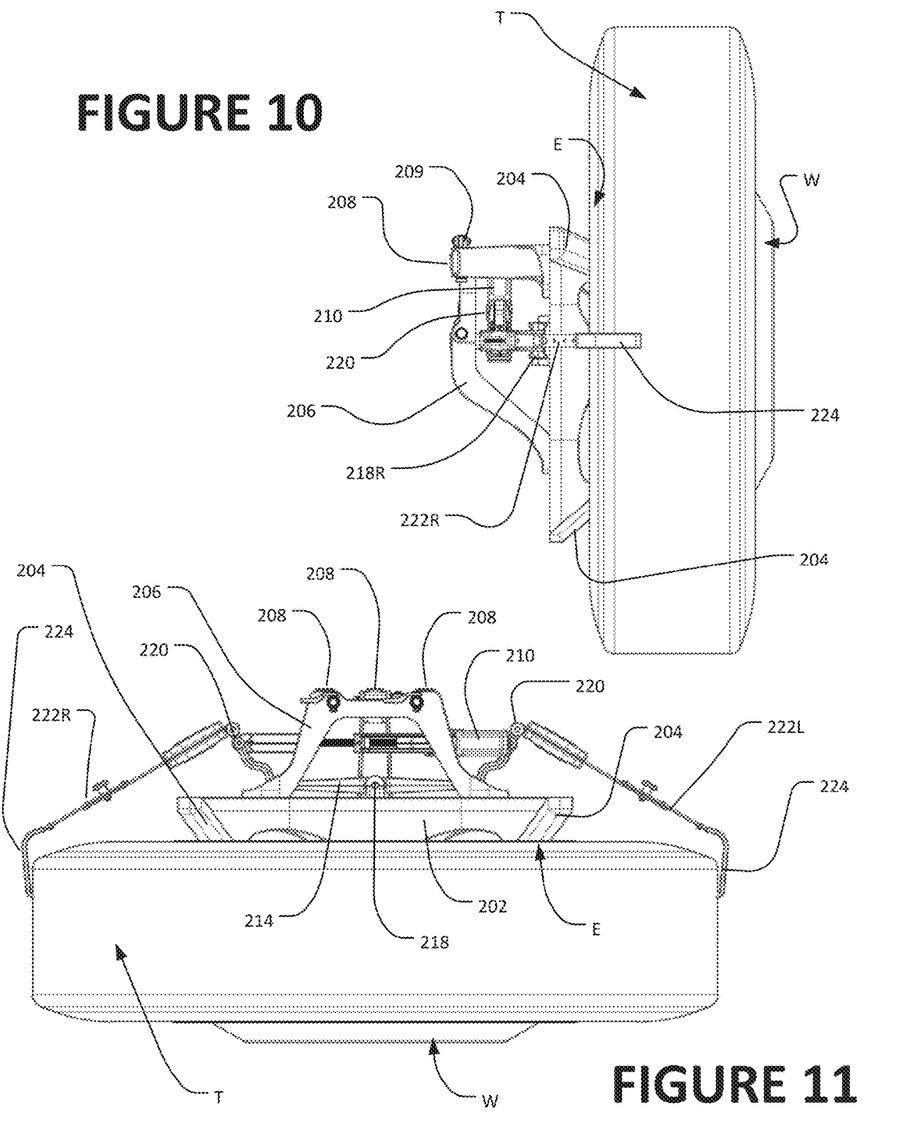
FIG. 10 is a lateral plan view of a recessed-hub light weight adaptor assembly of the present disclosure secured against the inner rim surface of a large diameter vehicle wheel assembly with a recessed central hub.
FIG. 11 is a top plan view of a recessed-hub light weight adaptor assembly of the present disclosure secured against the inner rim surface of a large diameter vehicle wheel assembly with a recessed central hub.

The recessed-hub light-weight adaptor assembly 200 comprises a base assembly 202 having a set of at least three spaced contact surfaces 204 for the abutting placement against the inner rim edge region E of the rim 10 in the large diameter wheel assembly W. The base assembly 202 is configured to space the contact surfaces 204 in a generally equidistant spacing, providing three stable points of contact against the rim inner edge region E. As best seen in FIG. 7, each contact surface 204 is inclined relative to the central axis of the adaptor 200, and has a surface area of sufficient size to engage the inner rim edge region E of wheel rims having a range of diameters, for example, from 16.5" to 19.5". Optionally, as seen in FIG. 8, each contact surface 204 may include at least one recessed portion 306, such as a step, for receiving the inner rim edge region E of a wheel rim 10 having a specific diameter or configuration. If each contact surface includes a recessed portion disposed at the same location, the base assembly 202 will seat securely onto the specific diameter wheel rim in a generally axially centered position. For ease of use, multiple recessed portions 306 corresponding to wheel rims 10 of different diameters or configurations may be included in each contact surface, and labels or other marking indicia 308 providing on the peripheral reverse side of the contact surface 204, such as seen in FIG. 9. By providing the labels or other marking indicia 308 on the reverse side of the contact surface, they are visible in the outboard direction to an operator installing the recessed-hub light-weight adapter assembly 200.

Figure 2:
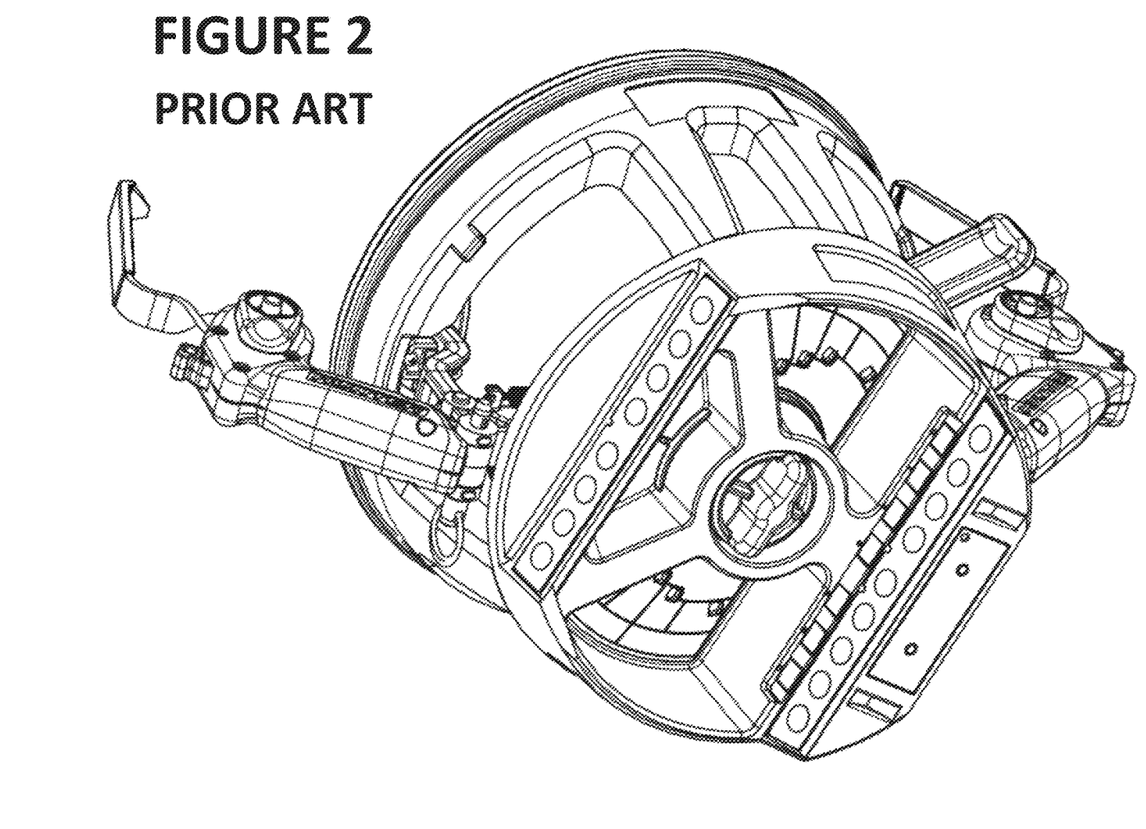
FIG. 2 is a perspective view of a prior art quick-grip adapter and optical target for use with passenger car wheel assemblies having generally low-profile central hub surfaces.

A support framework 206 carried axially outboard from the contact surfaces 204 by the base assembly 202 includes at least one coupling 208 suitable for receiving a stub-shaft connector from an optical target (not shown), an angle sensor (not shown) configured to acquire angular measurements, or other instrumentation such as laser emitters (not shown). Alternatively, it will be recognized that the optical target, angle sensor, or other instrumentation may be integrated directly into the support framework 206. Each coupling 208 includes an associated locking assembly 209, such as a lever or cam to engage the stub-shaft and secure the connector within the coupling 208. Preferably, as best seen in FIGS. 2 and 4, a total of three couplings 208 are provided. The three couplings 208 are disposed in a non-linear relationship to each other, with one disposed on the axis of the base assembly 202, and two disposed laterally off-axis, suitable for positioning optical targets, angle sensors, or instrumentation at different vertical elevations when the assembly 200 is secured to a large-diameter vehicle wheel assembly, as may be required to provide sensor line-of-sight clearances to adjacent sensors, targets, or imaging systems To hold the assembly 200 to the wheel assembly W, a clamp assembly 210, such as a spring-biased clamp assembly, is coupled to the base assembly 200 by a pivoting linkage assembly 212, positioned axially inboard of the support framework 206. The linkage assembly 212 consists of a truss member 214 coupled to a central surface 216 of the base assembly 202 by a central connection 218 for rotation about an axis which lies parallel to a plane containing the contact surfaces 204. The truss member 214 supports a left pivoting connection 218L and a right pivoting connection 218R equidistantly spaced on opposite sides of the central pivoting connection 218. The left and right pivoting connections each receive one end of an associated connecting linkage 220. Each linkage 220 is further coupled at an opposite end to an associated pivoting connection on the spring-biased clamp assembly 210, thereby establishing a double-pivoting connection. Extending radially outward from pivoting connections on opposite lateral sides of the clamp assembly 210, a pair of wheel clamp arms 222L and 222R are each configured to engage the tread surface of a tire T with suitable hooks 224 when the contact surfaces 204 of the base assembly 202 are in abutting placement against the inner rim edge E of the rim 10 of the large diameter vehicle wheel assembly W. The wheel clamp arms may have a fixed length or may be longitudinally adjustable. Similarly, the tire hooks 224 may be rigidly coupled to the wheel clamp arms, or may incorporate a pivoting and/or interchangeable connection.

Operation of the clamp assembly 210 applies a clamping load to the tire T tread surface through the wheel clamp arms 222L and 222R, holding the contact surfaces 204 against the inner rim edge E of the rim 10 of the vehicle wheel assembly W. Differences in the positioning of the contact surfaces 204 against the inner rim edge E of the wheel assembly "W" are accommodated by orientation changes at the central pivoting connection 218, while radial displacement of the base assembly 202 from the wheel assembly axis of rotation is accommodated by positioning changes via the left and right pivoting connections 218L and 218R.

Those of ordinary skill in the art will recognize that the specific configuration of the tension and locking mechanism 210, as well as the wheel clamp arms 222L and 222R may be varied from that which is shown in the accompanying figures. Any suitable mechanism capable of mechanical adjustment to engage the surfaces of a tire T mounted to a vehicle wheel W upon which the base assembly 202 is to be mounted, and which is further capable of providing a releasable clamping and/or tensioning force, such as by means of a combination of springs, levers, and/or cams such as shown in U.S. Pat. No. 7,810,244 B2 to Stieff et al. or in U.S. Pat. No. 8,341,848 B2 to Stieff et al., both of which are herein incorporated by reference, may be utilized without departing from the scope of the present disclosure.

It will be further recognized that the base 202 is not required to be placed coaxial with the wheel assembly rotational axis, but rather, may be secured in abutting placement against the inner rim edge E of the recessed central hub 10B on the vehicle wheel assembly, in a non-determined position and orientation relative to the wheel axis of rotation. A relationship between an optical target or angle sensor mounted to the support framework 206 at the coupling 208 and the wheel axis of rotation for the vehicle wheel assembly W can be subsequently determined during a suitable compensation procedure.

It will be readily apparent to those of ordinary skill in the art that the raised-hub light-weight adaptor 100, and the recessed-hub light-weight adaptor 200 are utilized in combination in a vehicle wheel alignment system suitable for use on heavy-duty vehicles. Typically, heavy-duty vehicles, such as trucks, utilize dual-wheel rear axles, which necessitates that the large diameter wheel assemblies have rims 10 that are reversible by providing axially offset central hub surfaces 10A, 10B. When a large diameter wheel assembly is mounted to the front steer axle of the heavy-duty vehicle, the rim 10 is positioned with the axially offset central hub surface projecting outward, defining the raised central hub surface 10A. When a rim 10 is positioned in the inboard positions on the dual-wheel rear axles, the axially offset central hub surface 10A is similarly disposed. However, wheel assemblies position in the outboard positions on the dual-wheel rear axles are reversed, such that the axially offset central hub surface is deeply recessed, defining the recessed central hub surface 10B for abutting against the outboard face of the inboard wheel assembly (the opposite side of the rim 10 from surface 10A). Accordingly, it will be understood that to obtain measurements for two or more axles of a typical heavy-duty vehicle configured with these types of wheel assemblies W, a pair of light-weight adaptors 100 are utilized for the raised central hub surface wheels on the front axle, while one or more pairs of light weight adaptors 200 are utilized for the recessed central hub surface wheels on the rear axles.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A recessed-hub adaptor assembly configured to secure an optical target or angle sensor relative to an outboard surface of a large-diameter vehicle wheel assembly consisting of a tire mounted to a wheel rim with a recessed central hub, comprising:
   a base assembly having a set of at least three spaced discrete contact surfaces at fixed positions configured for abutting placement against a circumferential inner rim edge of the outboard surface of the vehicle wheel assembly;
   a support framework secured to said base assembly axially outward from said set of discrete contact surfaces;
   a clamp assembly pivotally coupled to said base assembly by a linkage assembly adjacent to said support framework, at least a position of said clamp assembly adjustable relative to said base assembly;
   a pair of wheel clamp arms pivotally coupled to said clamp assembly; and
   a tire hook coupled to outboard ends of each of said wheel clamp arm assemblies.

2. The recessed-hub adaptor assembly of claim 1 wherein each of said wheel clamp arms is longitudinally adjustable.

3. The recessed-hub adaptor assembly of claim 1 wherein each of said tire hooks are pivotally coupled to an associated wheel clamp arm.

4. The recessed-hub adaptor of claim 1 wherein each of said discrete contact surfaces is outward facing from, and inclined relative to, a center axis of said base assembly.

5. The recessed-hub adaptor of claim 1 wherein said support framework includes at least one coupling for receiving an optical target, angle sensor, or other instrumentation.

6. The recessed-hub adaptor of claim 1 wherein each of said discrete contact surfaces includes a plurality of recessed portions in a contact face for fitting against said inner rim region of said vehicle wheel assembly, said plurality of recessed portions on each discrete contact surface spaced radially outward from a center axis of said base assembly at fixed distances associated with standard wheel rim diameters.

7. The recessed-hub adaptor assembly of claim 1 wherein said support framework includes an optical target.

8. The recessed-hub adaptor assembly of claim 1 wherein said clamp assembly is a spring-biased clamp assembly.

9. A recessed-hub adaptor assembly configured to secure an optical target or angle sensor relative to an outboard surface of a large-diameter vehicle wheel assembly consisting of a tire mounted to a wheel rim with a recessed central hub, comprising:
   a base assembly having a set of at least three spaced discrete contact surfaces configured for abutting placement against an inner rim region of the outboard surface of the vehicle wheel assembly;
   a support framework secured to said base assembly axially outward from said set of discrete contact surfaces;
   a clamp assembly pivotally coupled to said base assembly by a linkage assembly adjacent to said support framework, at least a position of said clamp assembly adjustable relative to said base assembly;
   a pair of wheel clamp arms pivotally coupled to said clamp assembly;
   a tire hook coupled to outboard ends of each of said wheel clamp arm assemblies; and
   wherein said linkage assembly includes:
   a truss member rotationally coupled to a central surface of said base assembly for limited rotation about an axis parallel to a plane containing each of said discrete contact surfaces;
   a first linkage pivotally coupled to a first lateral end of the truss member;
   a second linkage pivotally coupled to an opposite lateral end of the truss member; and
   wherein said clamp assembly is pivotally mounted between said first and second linkages, such that a position and an orientation of said clamp assembly is adjustable relative to said base assembly.

10. A set of adaptors for mounting optical targets, angle sensors, or instrumentation to vehicle wheel assemblies on a heavy-duty vehicle having outwardly projecting central hub surfaces associated with at least one front axle and deeply recessed central hub surfaces associated with at least one rear axle, comprising:
   a pair of raised-hub adaptor assemblies, each raised-hub adaptor assembly configured with an annular base to secure the optical target, angle sensor, or instrumentation relative to an outboard surface of a front axle vehicle wheel assembly consisting of a tire mounted to a wheel rim with an outwardly projecting central hub;
   at least one pair of recessed-hub adaptor assemblies, each recessed-hub adaptor assembly configured to secure the optical target, angle sensor, or instrumentation relative to an outboard surface of a fixed-axle vehicle wheel assembly consisting of a tire mounted to a wheel rim with a deeply recessed central hub;
   wherein each recessed-hub adaptor assembly includes a base assembly having a set of at least three discrete contact surfaces in a fixed arrangement, each discrete contact surface configured for abutting placement against a circumferential inner rim region of said outboard surface of said fixed axle vehicle wheel assembly; and
   wherein said set of discrete contact surfaces in fixed arrangement are sized to abut said inner rim regions on fixed axle vehicle wheel assemblies having a plurality of rim diameters.

11. The set of adaptors of claim 10 wherein each raised-hub adaptor assembly includes a distal end surface of said annular base configured for non-determined abutting placement against the outboard surface of the vehicle wheel assembly, between a circumferential lip of the wheel rim and an axial center point of the wheel rim;
   a receiving member secured to said annular base by a pair of diametrically opposed webs extending axially outward from said annular base, said receiving member including at least one coupling for receiving the optical target, angle sensor, or instrumentation;

a clamp assembly coupled to said annular base by a pair of linkages axially inboard of said receiving member, at least a position of said clamp assembly adjustable relative to said annular base;

a pair of wheel clamp arms pivotally coupled to said spring-biased clamp assembly; and a tire hook coupled to outboard ends of each of said wheel clamp arm assemblies.

12. The set of adaptors of claim 10 wherein each recessed-hub adaptor assembly includes a support framework secured to said base assembly axially outward from said set of discrete contact surfaces, said support framework including at least one coupling for receiving the optical target assembly, angle sensor, or instrumentation;

a clamp assembly pivotally coupled to said base assembly by a linkage assembly inboard of said support framework, a position and orientation of said clamp assembly adjustable relative to said base assembly;

a pair of wheel clamp arms pivotally coupled to said clamp assembly; and a tire hook coupled to outboard ends of each of said wheel clamp arm assemblies.

13. The set of adaptors of claim 12 wherein each of said discrete contact surfaces in said set is outward facing from, and inclined relative to, a center axis of said base assembly.

14. The set of adaptors of claim 12 wherein each of said discrete contact surfaces includes a plurality of recessed portions in a contact face for receiving a wheel rim surface, said plurality of recessed portions on each discrete contact surface spaced radially outward from a center axis of said base assembly at fixed distances associated with standard wheel rim diameters.

15. A set of adaptors for mounting optical targets, angle sensors, or instrumentation to vehicle wheel assemblies on a heavy-duty vehicle having outwardly projecting central hub surfaces associated with at least one front axle and deeply recessed central hub surfaces associated with at least one rear axle, comprising:

a pair of raised-hub adaptor assemblies, each raised-hub adaptor assembly configured with an annular base to secure the optical target, angle sensor, or instrumentation relative to an outboard surface of a front axle vehicle wheel assembly consisting of a tire mounted to a wheel rim with an outwardly projecting central hub;

at least one pair of recessed-hub adaptor assemblies, each recessed-hub adaptor assembly configured to secure the optical target, angle sensor, or instrumentation relative to an outboard surface of a fixed-axle vehicle wheel assembly consisting of a tire mounted to a wheel rim with a deeply recessed central hub, wherein each recessed-hub adaptor assembly includes:

a base assembly having a set of at least three discrete contact surfaces configured for abutting placement against an inner rim region of said outboard surface of said fixed axle vehicle wheel assembly;

a support framework secured to said base assembly axially outward from said set of discrete contact surfaces, said support framework including at least one coupling for receiving the optical target assembly, angle sensor, or instrumentation;

a clamp assembly pivotally coupled to said base assembly by a linkage assembly inboard of said support framework, a position and orientation of said clamp assembly adjustable relative to said base assembly;

a pair of wheel clamp arms pivotally coupled to said clamp assembly; and a tire hook coupled to outboard ends of each of said wheel clamp arm assemblies; and wherein said linkage assembly includes:

a truss member rotationally coupled to a central surface of said base assembly for limited rotation about an axis parallel to a plane containing each of said discrete contact surfaces;

a first linkage pivotally coupled to a first lateral end of the truss member;

a second linkage pivotally coupled to an opposite lateral end of the truss member; and wherein said clamp assembly is pivotally mounted between said first and second linkages, such that a position and an orientation of said clamp assembly is adjustable relative to said base assembly.

16. A method for placement of a recessed-hub adaptor assembly against an outboard surface of a large diameter vehicle wheel assembly consisting of a tire mounted to a wheel rim with a recessed central hub, the recessed-hub adaptor assembly having at least three discrete contact surfaces on a base assembly, a support framework secured to said base assembly axially outward from said set of discrete contact surfaces, a pair of wheel clamp arms with tire hooks, and a clamp assembly coupling the wheel clamp arms to the base assembly, said clamp assembly pivotally coupled to said base assembly by a linkage assembly adjacent to said support framework, comprising:

abutting each of said discrete contact surfaces against an inner rim edge of the outboard surface of the vehicle wheel assembly;

adjusting said linkage assembly to alter at least a position of said clamp assembly relative to said base assembly; and engaging each of said tire hooks with a tire tread surface of the large diameter vehicle wheel assembly, whereby engagement of said tire hooks with said tire tread surface holds said discrete contact surfaces in abutting engagement with said inner rim edge.

17. The method of claim 16 further including adjusting an orientation of said clamp assembly relative to said base assembly to engage each of said tire hooks with said tire tread surface of the large diameter vehicle wheel assembly.

18. The method of claim 16 wherein abutting each of said discrete contact surfaces against said inner rim edge includes engaging the inner rim edge with a recessed portion on each of said discrete contact surfaces.

19. The method of claim 16 further including the step of coupling one of an optical target or sensor assembly adjacent to an outboard surface of said base assembly.

20. The method of claim 19 wherein said step of coupling includes receiving a stub-shaft connector associated with said optical target or sensor assembly within a coupling in said outboard face of said base assembly.

21. The method of claim 16 wherein abutting each of said discrete contact surfaces further includes orienting said base assembly to align an optical target, angle sensor, or other instrumentation carried thereon with an operative field of view.

* * * * *